J. GAPP.
PIPE COUPLING.
APPLICATION FILED JUNE 17, 1911.
1,034,781.
Patented Aug. 6, 1912.
2 SHEETS—SHEET 2.
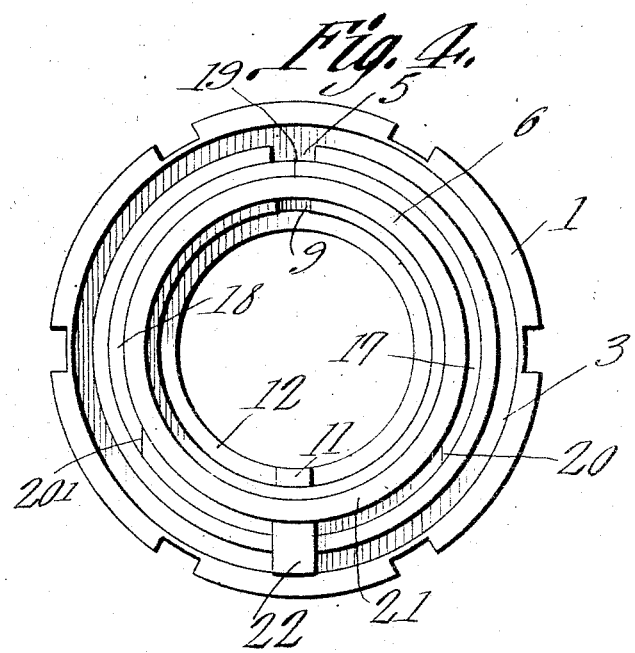
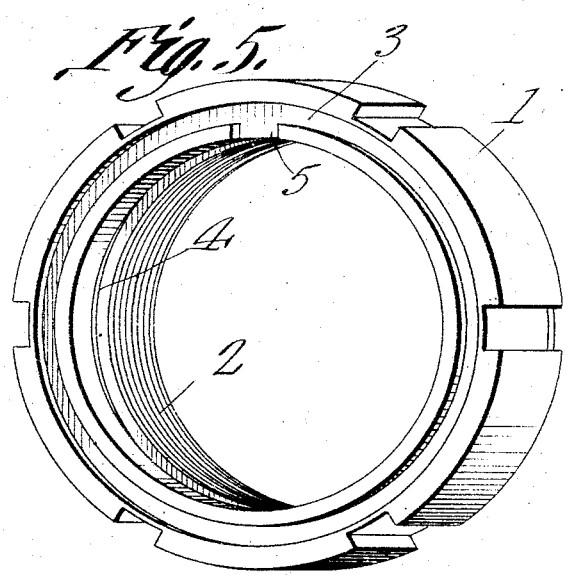
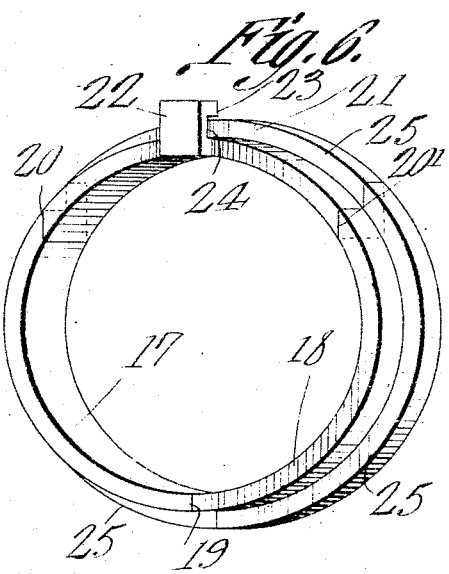
John Gapp, Inventor

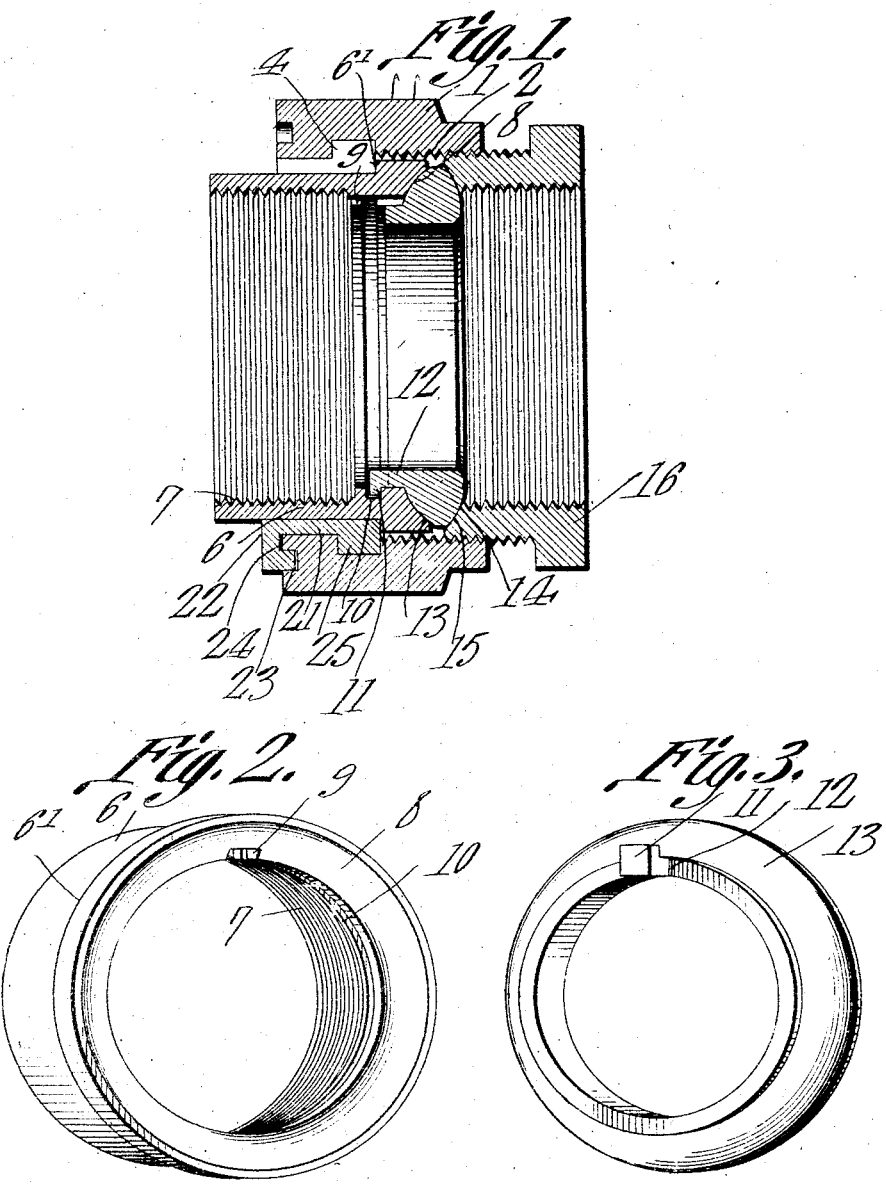

UNITED STATES PATENT OFFICE.

JOHN GAPP, OF SCRANTON, PENNSYLVANIA.

PIPE-COUPLING.

1,034,781.  Specification of Letters Patent.  Patented Aug. 6, 1912.

Application filed June 17, 1911. Serial No. 633,742.

*To all whom it may concern:*

Be it known that I, JOHN GAPP, a citizen of the United States, residing at Scranton, in the county of Lackawanna and State of Pennsylvania, have invented a new and useful Pipe-Coupling, of which the following is a specification.

This invention relates to improvements in couplings for pipes or hose, the primary object of the invention being the provision of a coupling or union provided with an exterior clamping band or sleeve in position to receive a sectional shouldered member and a self locking device, whereby the coupling ring is properly supported and held water tight by frictional contact, the construction being such that the sectional member can be readily removed or inserted in the union or coupling.

A further object of this invention is the production of a sectional key ring, one section of which has a locking hook to engage the outer face of the nut to hold the parts in locked position without the employment of a spring, and which can be removed when desired by slipping one section of the key-member inwardly to permit the easy removal of the parts when desired.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the drawings: Figure 1 is a sectional view through the coupling or union assembled. Fig. 2 is a perspective view of the thimble member of the coupling. Fig. 3 is a similar view of the valve or coupling ring of the coupling. Fig. 4 is an end view of the coupling taken from the thimble end thereof. Fig. 5 is a perspective view of the nut member of the coupling. Fig. 6 is a perspective view of the sectional key-member of the coupling.

Referring to the drawings, the numeral 1 designates the nut-member, clamping band or sleeve of the coupling and is provided with the interiorly threaded portion 2, the annular recess or channel 3 at one end thereof being concentric with the center of the member 1, and the cut-away portion 5 being provided to form a groove which communicates with the channel 4 formed in the member 1, the purpose of which will presently appear. Mounted within the member 1 is a thimble 6, which is provided with the interior screw threads as at 7, and with the annular shoulder 6' exteriorly at the other end thereof, the inner end of the said member being further provided with the concaved portion 8. Provided within the end of this thimble is a channel 9, which leads to the annular recess 10, the hook or locking end 11 of the coupling ring 12, being adapted to be inserted in the said channel 9 so that the ring 12 may be rotated to cause the hook or locking end 11 to assume the position as shown in Fig. 4, and thereby lock the said coupling ring 12 in the position as clearly shown in Fig. 1, so that its convex surface 13 will be in engagement with the concaved portion 8 of the thimble 6.

Mounted within the threaded end of the member 1 is the solid shouldered removable coupling member 16, in whose inner end is formed a concaved recess 14 for the frictional reception of the convex portion 15 of the coupling ring or gasket member 12. By this means it will be seen that the connection between the thimble and the member 16 will be made water tight.

In order to lock the parts in the position, as clearly shown in Fig. 1 of the drawings, the sectional key-member or ring as clearly illustrated in Fig. 6 of the drawing is employed. This ring consists of the three sections 17, 18 and 21, respectively, the end faces at 19, 20 and 20' being parallel when the ring is assembled, as clearly illustrated in Figs. 4 and 6, of the drawings, thus permitting the key-member 21 to be slid into proper position, and also permit the sectional key-member or ring to be readily placed within the clamping band or member 1, or removed therefrom when desired.

As clearly illustrated in Figs. 4 and 6 of the drawings, the key sectional ring is provided with the key section 21, and this section 21 is provided with a projection 22, having the lip 23, which provides a receptacle or recessed portion 24, which when the parts are in proper position as clearly illustrated in Fig. 1 of the drawings, the said lip 22 will fit in the annular recess 3, it being inserted through the cut away portion as at 5 and then rotated with the sections 17 and 18, so that the shouldered portion or annular projection 25 formed upon all three of the sections 17, 18 and 21, will be seated within the recess 4 of the member 1, this sectional member providing a locking device for retaining the parts in the position as clearly shown in Figs. 1 and 4, and at the same time providing a means which is readily replaced.

The member 21 of the ring shown in Fig. 6 is in reality a keystone for the sections, as the two sections 17 and 18 are mounted so that the projecting portion 25 will enter the recess 4 in the member 1, at which time the member 21 is inserted from the center of the coupling and slid so that the portions at 20 and 20' will slide into a tight fit with the sections 17 and 18 at said points and the hooked lip 22 will pass into the recess 5 of the member 1, at which time the entire sectional ring will be rotated so that the lip will assume the position as shown in Fig. 1, that is diametrically opposite to the recess 5 of the section 1, thereby locking the parts in the desired position.

What is claimed is:

1. A coupling having a sectional ring member, one of said sections being a key section to hold all the sections assembled within the coupling, and a hook carried by said key section.

2. A coupling having a nut member with a concentric recess in one end, and an interior annular recess within the body adjacent said end, and a sectional key ring adapted to fit in said interior annular recess and engage the concentric recess to lock the sections within and to the nut member.

3. A sectional ring for couplings comprising two segmental sections, and a key section, the end faces of all of said sections being parallel when the ring is assembled, said key section having a locking hook.

4. A coupling comprising an outer nut member having a concentric recess in one end, a channel leading radially thereinto, and an annular recess within the body thereof, a shouldered coupling member mounted in the other end of the nut member, a gasket mounted within the casing and abutting said coupling member, a thimble member mounted from the opposite end and rotatable within the nut member, the inner end of the said thimble member being provided with a cavity to receive the gasket in opposition to the coupling member, and a sectional ring for retaining the thimble member within the nut member, comprising three sections, the end faces of all of which are parallel when the ring is assembled, said sections when assembled providing a ring to fit in the annular recess within the nut member and having a locking means for entering the concentric recess of the nut member.

In testimony that I claim the foregoing as my own, I have hereto affixed my signature in the presence of two witnesses.

JOHN GAPP.

Witnesses:
 JOHN LENTES,
 WILLIAM C. KOLDHOFF.